United States Patent
Sato et al.

(10) Patent No.: US 6,597,655 B2
(45) Date of Patent: Jul. 22, 2003

(54) OPTICAL RECORDING MEDIUM HAVING WOBBLING GROOVE EXTENDING ALONG THE TRACKS

(75) Inventors: Manabu Sato, Miyagi (JP); Somei Endo, Miyagi (JP); Toshihiro Akimori, Miyagi (JP)

(73) Assignee: Sony Corporation, Tokyo (JP)

( * ) Notice: Subject to any disclaimer, the term of this patent is extended or adjusted under 35 U.S.C. 154(b) by 311 days.

(21) Appl. No.: 09/778,731

(22) Filed: Feb. 8, 2001

(65) Prior Publication Data

US 2001/0038604 A1 Nov. 8, 2001

(30) Foreign Application Priority Data

Feb. 10, 2000 (JP) ........................................ 2000-038246

(51) Int. Cl.⁷ ................................................. G11B 7/24
(52) U.S. Cl. .................................... 369/275.4; 428/64.4
(58) Field of Search ........................ 369/275.4, 275.2, 369/275.1, 275.3, 44.26; 428/64.1, 64.3, 64.4; 430/320, 321

(56) References Cited

U.S. PATENT DOCUMENTS

| | | | | |
|---|---|---|---|---|
| 4,931,336 A | * | 6/1990 | Haneda ................... | 369/275.4 |
| 6,021,109 A | * | 2/2000 | Sprui et al. .............. | 369/275.4 |
| 6,128,273 A | * | 10/2000 | Horie et al. ............. | 369/275.4 |
| 6,287,660 B1 | * | 9/2001 | Hosaka et al. ........... | 369/275.4 |
| 6,335,916 B1 | * | 1/2002 | Endo et al. .............. | 369/275.4 |
| 6,438,098 B1 | * | 8/2002 | Nakajima et al. ........ | 369/275.4 |
| 6,501,728 B2 | * | 12/2002 | Koizumi et al. ......... | 369/275.4 |

* cited by examiner

*Primary Examiner*—Tan Dinh
(74) *Attorney, Agent, or Firm*—Oblon, Spivak, McClelland, Maier & Neustadt, P.C.

(57) ABSTRACT

An optical recording medium which can provide a wobbling signal at a sufficiently high level even if the track pitch is reduced to enhance the recording density. The recording medium can attain a practically adequate recording-reproducing characteristic such as jitter characteristic. The medium has a wobbling groove that has a depth falling within the range of $\lambda/2.90$ n to $\lambda/2.15$ n. Here, $\lambda$ is the wavelength of a light beam applied to record and reproduce signals and n is the refractive index of the substrate of the optical recording medium. The ratio of the width Wg of the wobbling groove to the track pitch Tp (Wg/Tp) falls within the range of 25.0% to 45.5%.

5 Claims, 4 Drawing Sheets

OPTICAL RECORDING MEDIUM HAVING WOBBLING GROOVE EXTENDING ALONG THE TRACKS

BACKGROUND OF THE INVENTION

The present invention relates to an optical recording medium which has a wobbling groove extending along the recording tracks, on which signals are recorded in the form of changes in reflectance of organic dye-based recording material, while wobbling signals are being reproduced from the wobbling groove. The invention also relates to a master plate for use in manufacturing such an optical recording medium.

Optical discs have been put to practical use as optical recording media. Signals can be optically recorded on, and reproduced from, an optical disc. Known as such an optical disc is one on which signals can be written. This type of an optical disc (hereinafter referred to as "CD-R") is used in so-called compact disc recordable systems. A CD-R is a rewritable optical disc made of organic dye-based material, on which signals can be recorded and from which signals can be reproduced.

The CD-R has a wobbling groove that extends along the recording tracks. A wobbling groove is a guide groove that meanders at a prescribed frequency. So meandering, the wobbling groove records signal components. It should be noted that a "guide groove" extends along a recording track to facilitate the tracking servo control that is performed by, for example, push-pull method.

In a CD-R, the sector data containing frequency-modulated, absolute time data is recorded in the form of signals (wobbling signals) represented by the wobbling groove (ATIP: Absolute Time In Pregroove). In the compact disc recordable system that uses a CD-R as recording medium, a recording-reproducing light beam is focused, forming a light spot at a wobbling groove. Wobble signals superimposed on carrier waves of, for example, 22.05 kHz are thereby detected from the wobbling groove. The wobble signals are frequency-modulated, thus generating a data stream that contains absolute time data.

With a system that records sector data containing the absolute time data, in the form of wobble signals, it is possible to record signals continuously. The system is therefore compatible with read-only optical discs, on which signals are recorded continuously. In a system wherein address data is recorded at the head of each sector, the absolute time data and the recorded data are spaced apart; namely, the signals recorded are discontinuous. Consequently, this system can hardly be compatible with read-only optical discs, on which signals are recorded continuously. By contrast, the first-mentioned system that records sector data containing the absolute time data, in the form of wobble signals can easily be rendered compatible with read-only optical discs.

Optical discs of the type mentioned above are now modified to record more signals, while having the same diameter as the existing standard optical discs. In other words, they are modified to record signals at higher densities. Moreover, it is proposed that CD-Rs be provided that can record signals at density two times or four times as high as the recording density of the existing standard CD-R.

To increase the recording density of an optical disc, it is advisable to reduce the track pitch, i.e., and the intervals at which the recording tracks are formed on the optical disc. If the track pitch is decreased, however, the recording-reproducing characteristics of the disc (jitter characteristic and the like) will be deteriorated.

Therefore, to provide two-time density CD-Rs and four-time density CD-Rs, i.e., optical discs having high recording density, it is necessary not only to reduce the track pitch, but also to implement sufficient recording-reproducing characteristics, such as jitter characteristic and the like.

A wobbling groove may be made in the surface of, for example, a CD-R, thus recording the absolute time data on the CD-R. In this case, it is desired that a wobble signal be efficiently reproduced from the wobbling groove.

In order to enhance the recording density of an optical disc, it is necessary, as described above, not only to reduce the track pitch, but also to achieve sufficient recording-reproducing characteristics, such as jitter characteristic and the like, so that wobbling signals and the like may be generated at adequately high level. (Note that the wobbling signals and the like are required to record signals on and reproduce signals from the recording tracks.)

BRIEF SUMMARY OF THE INVENTION

The present invention has been made in view of the foregoing. An object of the invention is to provide an optical recording medium from which wobbling signals can be generated at sufficiently high level and which exhibits sufficient recording-reproducing characteristics, such as jitter characteristic and the like. Another object of this invention is to provide a master plate for manufacturing such an optical recording medium.

An optical recording medium according to this invention has recording tracks and a wobbling groove extending along the recording tracks. It is designed to record signals in the form of changes in reflectance of organic dye-based recording material, while reproducing a wobbling signal from the wobbling groove. The wobbling groove has a depth ranging from $\lambda/2.90$ n to $\lambda/2.15$ n. Here, $\lambda$ is the wavelength of a light beam applied to record and reproduce signals and n is the refractive index of medium existing between a surface to which the light beam is applied and surface in which the wobbling groove is made. The wobbling groove has a width Wg, and the recording tracks are arranged at a pitch Tp. The ratio of the width Wg to the track pitch Tp, Wg/Tp, falls within the range of 25.0% to 45.5%.

Since the wobbling groove has a depth and width specified above, the optical recording medium of the invention can provide a wobble signal that has a level high enough to record and reproduce signals even if the track pitch is decreased to enhance the recording density, and can reliably attain a practically adequate jitter characteristic. Hence, it is possible to record signals on this optical recording medium at high recording density.

In the optical recording medium according to the invention, it is desired that Ag/Tp should fall within the range of ±1.82% to ±3.18%, where Ag is the amplitude of the wobbling groove. Even if the wobbling groove has the depth and width specified above, a wobble signal may not be generated from the optical recording medium in the case where the amplitude of the wobbling groove is too small. Even if the wobbling groove has the depth and width specified above, the medium may fail to attain an adequate recording-reproducing characteristic such as jitter characteristic in the case where the amplitude of the wobbling groove is too large. Nonetheless, the optical recording medium of the invention can reliably provide a wobble signal and attains good recording-reproducing characteristic such as jitter characteristic, because the wobbling groove has the amplitude specified above.

A master plate according to the present invention is designed for use in manufacturing an optical recording medium. The optical recording medium has recording tracks and a wobbling groove extending along the recording tracks. The medium is designed to record signals in the form of changes in reflectance of organic dye-based recording material, while reproducing a wobbling signal from the wobbling groove, said master plate having a groove pattern that corresponds to the wobbling groove of the optical recording medium. The master plate has a groove pattern that corresponds to the wobbling groove.

The optical recording medium manufactured by the use of the master plate has a wobbling groove that has a depth ranging from $\lambda/2.90$ n to $\lambda/2.15$ n, where $\lambda$ is the wavelength of a light beam applied to record and reproduce signals and n is the refractive index of medium existing between a surface to which the light beam is applied and surface in which the wobbling groove is made. The wobbling groove has a width Wg, and the recording tracks are arranged at a pitch Tp. The ratio of the width Wg to the track pitch Tp, Wg/Tp, falls within the range of 25.0% to 45.5%. That is, the master plate has a groove pattern corresponding to the wobbling groove having the depth and width specified above.

Any optical recording medium manufactured by the use of the master plate can provide a wobble signal that has a level high enough to record and reproduce signals even if the track pitch is decreased to enhance the recording density, and can reliably attain a practically adequate jitter characteristic. Hence, it is possible to record signals on this optical recording medium at high recording density.

It is desired that the master plate have a groove pattern corresponding to a wobbling groove in which Ag/Tp may falls within the range of ±1.82% to ±3.18%, where Ag is the amplitude of the wobbling groove. If the ratio Ag/Tp falls within this range, the optical recording medium made by using the master plate will provide a wobble signal that has a level high enough to record and reproduce signals even if the track pitch is decreased to enhance the recording density, and will reliably attain a practically adequate jitter characteristic. It is therefore possible to record signals on this optical recording medium at high recording density.

As described above in detail, the optical recording medium according to the present invention can provide a wobble signal that has a level high enough to record and reproduce signals even if the track pitch is decreased to enhance the recording density, and can reliably attain a practically adequate jitter characteristic.

The master plate according to this invention can serve to manufacture an optical recording medium which can provide a wobble signal of a level high enough to record and reproduce signals even if the track pitch is decreased to enhance the recording density, and which can reliably attain a practically adequate jitter characteristic.

DETAILED DESCRIPTION OF THE INVENTION

An embodiment of the present invention will be described in detail, with reference to the accompanying drawings. The embodiment is a CD-R that is a standard rewritable optical disc. Nonetheless, the present invention is not limited to this embodiment. The invention can be applied to any optical recording medium that has a wobbling groove extending along the recording tracks, on which signals are recorded in the form of changes in reflectance of organic dye-based recording material, while a wobbling signal is being reproduced from the wobbling groove.

The CD-R according to the invention will be described.

Figure 1:
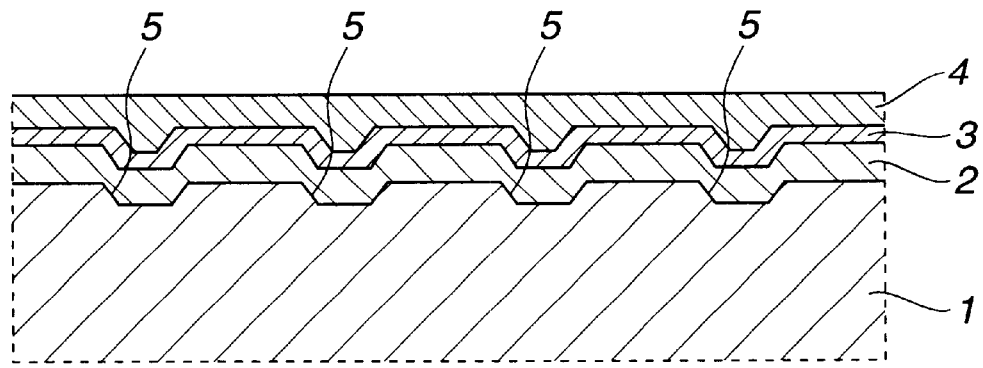
FIG. 1 is a sectional view of a CD-R according to the present invention.

As shown in FIG. 1, the CD-R comprises a disc-shaped substrate 1, a recording layer 2, a reflection film 3, and a protective layer 4. The substrate 1 is made of polymethyl methacrylate (PMMA), polycarbonate (PC), or the like. The recording layer 2 is made of organic dye-based, recording material and has been formed on the substrate 1 by spin coating. The reflection film 3 is made of, for example, gold (Au) or Silver (Ag), and has been formed on the recording layer 2. The protective layer 4 is made of, for example, ultraviolet-curing resin; it has been formed by means of spin coating.

Figure 2:
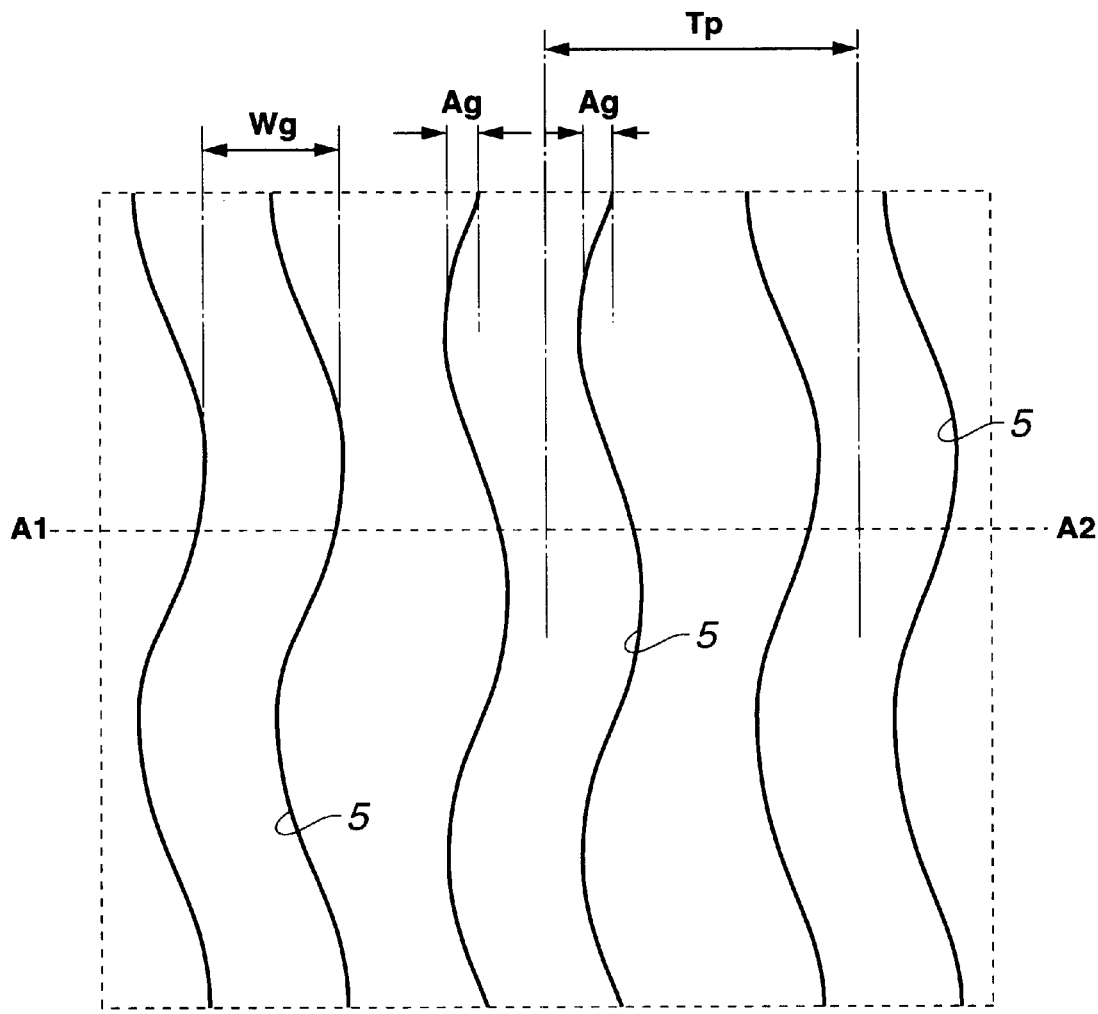
FIG. 2 is a schematic plan view showing parts of some recording tracks provided on the CD-R.

As shown in FIG. 2 that is a plan view of the CD-R, the substrate 1 has a wobbling groove 5, i.e., a meandering guide groove, made in one surface. The wobbling groove 5 is, for example, spiral. Those parts of the recording layer 2, which correspond to the wobbling groove 5, are the recording tracks. EFM-modulated signals (EFM signals) may be recorded in the recording tracks.

The wobbling groove 5 meanders (or wobbles) at a prescribed frequency. Thus wobbling, the groove 5 represents ATIP (Absolute Time in Pregroove) wobble signals, i.e., sector data that contains FM-modulated absolute time data.

The ATIP wobble signal is reproduced from the wobbling groove 5, and the absolute time data is obtained from the wobbling signals. EFM signals are recorded in the recording tracks, in the form of changes in reflectance of organic dye-based recording material of the recording layer 2.

Figure 3:
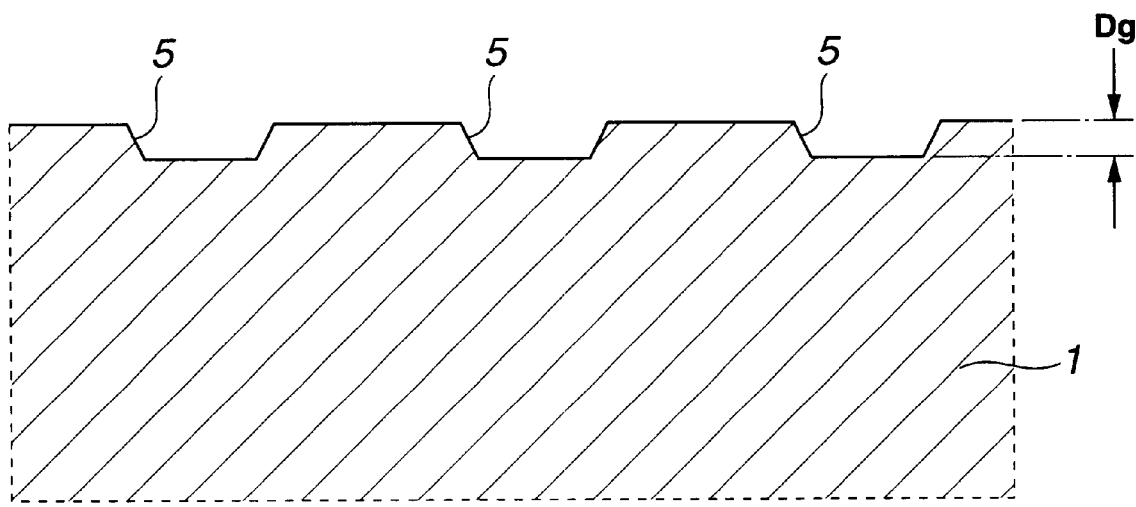
FIG. 3 is a sectional view, taken along line A1–A2 shown in FIG. 2.

In the CD-R according to this invention, the wobbling groove 5 has a depth Dg shown in FIG. 3, ranging from $\lambda/2.90$ n to $\lambda/2.15$ n, where $\lambda$ is the wavelength of the light beam applied to the CD-R to record and reproduce signals and n is the refractive index of the substrate 1. (It should be noted that the substrate 1 is the medium existing between the surface to which a light beam is applied and the surface in which the wobbling groove 5 is made). Thus, the depth Dg is 170 nm to 230 nm if the refractive index n of the substrate 1 is 1.58 and the wavelength $\lambda$ of the light beam is 780 nm. FIG. 3 is a sectional view, taken along line A1–A2 shown in FIG. 2.

The wobbling groove 5 has a width Wg, and the recording tracks are arranged at a pitch Tp. The ratio of the width Wg to the track pitch Tp, i.e., Wg/Tp, ranges from 25.0% to 45.5%. Thus, the width Wg of the wobbling groove 5 falls within the range of 0.275 $\mu$m to 0.50 $\mu$m if the track pitch Tp is 1.10 $\mu$m.

In the CD-R according to the invention, the wobbling groove 5 has amplitude Ag. The amplitude Ag is of such a value that the ratio of the amplitude Ag to the track pitch Tp, i.e., Ag/Tp, falls within the range of ±1.82% to ±3.18%. Hence, the amplitude Ag of the wobbling groove 5 ranges from ±20 nm to ±35 nm if the track pitch Tp is 1.10 μm.

The depth Dg, width Wg and amplitude Ag of the wobbling groove 5 are set within the ranges specified above. This makes it possible to reproduce the ATIP signals at a sufficiently high level even if the track pitch Tp is decreased to, for example, about 1.10 μm. This also reduces the jitter of EFM signals to a practically negligible value. The conventional standard CD-R has a track pitch of 1.60 μm. By contrast, the CD-R of this invention has a shorter track pitch of 1.10 μm and, therefore, attains a recording density that is twice as high as that of the conventional CD-R. Moreover, the track pitch Tp may be decreased to 0.8 μm. In this case, the recording density will increase to a value that is approximately four times as large as the recording density of the conventional CD-R.

A method of manufacturing the CD-R according to the invention will be described below.

A master plate for use in manufacturing the CD-R is prepared first. The master plate has a groove pattern that corresponds to the wobbling groove 5 to be made in the CD-R.

In the process of preparing the master plate, a disc-shaped glass substrate is washed and dried. The glass substrate is coated with a photoresist that is a photosensitive layer. A laser cutting apparatus applies a laser beam to the photoresist. A latent image of the wobbling groove 5 to be made in the CD-R is thereby formed on the photoresist. (The laser cutting apparatus will be later described in detail.)

After the latent image has been formed on the photoresist, the glass substrate is placed on the turntable provided in a developing apparatus, with the photoresist turned upwards. The turntable is driven, rotating the glass substrate. While the glass substrate is rotating, a developing liquid is dribbled onto the photoresist, thereby forming a groove pattern that corresponds to the wobbling groove.

Next, an electrically conductive film made of Ni or the like is formed on the pattern by means of electroless plating. Thereafter, the glass substrate, now having the electrically conductive film, is set in an electro-casting machine. In the machine, a layer of Ni or the like is formed on the electrically conducive film by electro-plating to a thickness of about 300±5 μm. This plated layer is then peeled off the glass substrate and washed with acetone or the like, thereby removing the photoresist from the surface on which the groove pattern has been transferred.

Thus, a master plate (known as "stamper") that is a plated layer with the pattern transferred from the glass substrate is obtained for use in manufacturing the optical recording medium according to the present invention. The master plate has a groove pattern that corresponds to a wobbling groove 5 extending along the recording tracks. The master plate will be used to manufacture the optical recording medium having a wobbling groove 5 and recording tracks. In the recording tracks, signals will be recorded in the form of changes in reflectance of organic dye-based recording material, while reproducing the wobbling signal from the wobbling groove 5. The groove pattern of the master plate is spiral.

Using the master plate thus made, transparent resin such as polycarbonate is subjected to injection molding, thereby manufacturing a disc substrate 1 that has a wobbling groove 5. The disc substrate 1 is a resin molding that has, for example, a thickness of 1.2 mm and a diameter of 120 mm. Its refractive index is, for example, 1.58.

A TFP (Tetrafluoropropanol) solution containing 2 wt % of cyanine dye was dribbled onto the disc substrate thus manufactured. The disc substrate is rotated at 400 rpm for 20 seconds, removing the residual part the TFP solution and drying the disc substrate 1. Then, the substrate is coated with a recording-layer material consisting mainly of cyanine dye, by means of spin coating or the like, thereby forming a recording layer on the disc substrate 1.

A silver thin film having a thickness of, for example, 100 nm, is formed on the recording layer by means of sputtering. An ultraviolet-curing resin layer having a thickness of, for example, 10 μm is formed on the silver thin film by means of spin coating. Ultraviolet rays are applied to the ultraviolet-curing resin layer, thus curing the same and forming a protective layer 4. A CD-R according to the present invention is thereby manufactured.

In the process of manufacturing the master plate, a laser cutting apparatus forms a latent image of wobbling groove 5 on the photoresist coated on the glass substrate. The laser cutting apparatus will be described in detail, with reference to FIG. 4.

Figure 4:
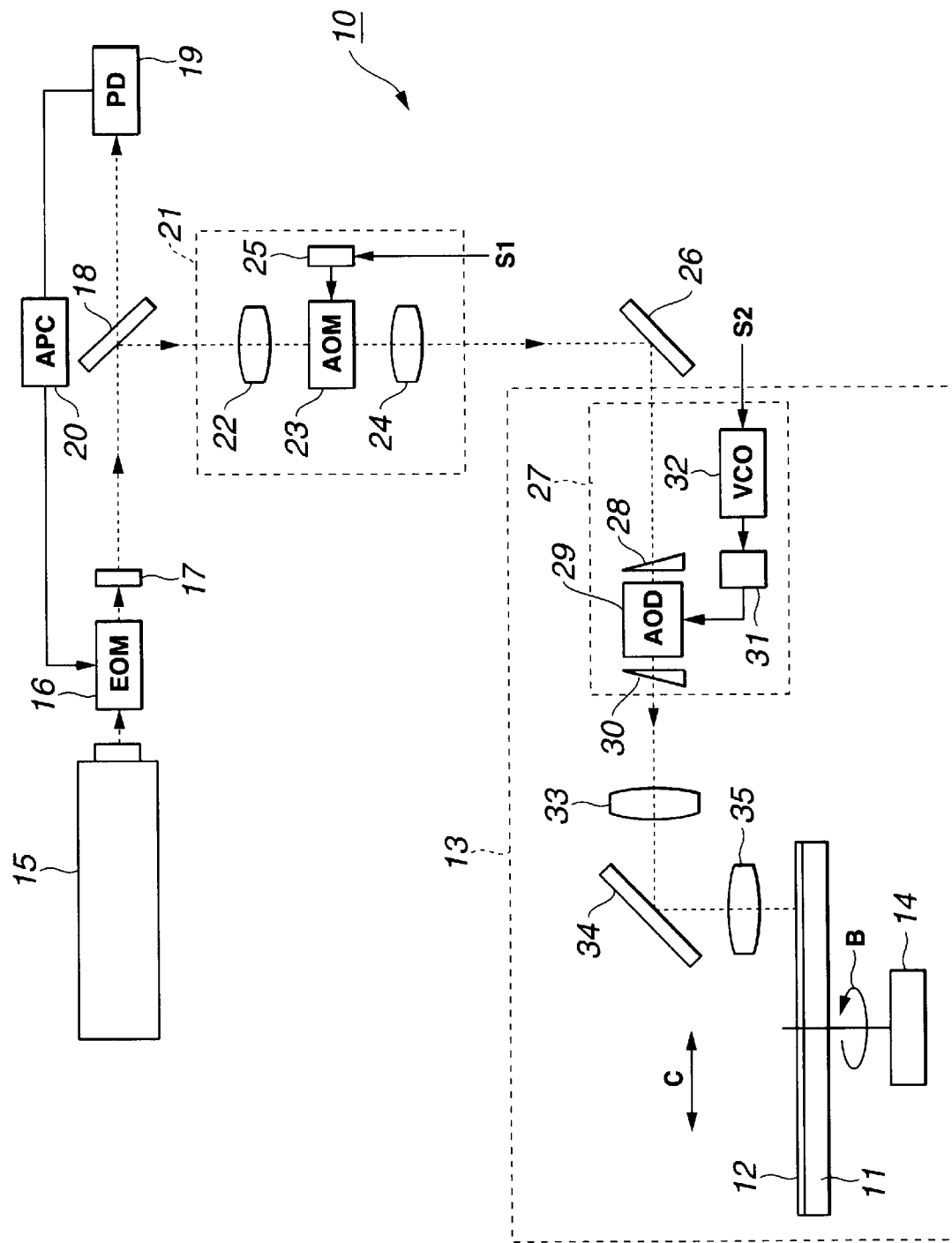
FIG. 4 is a diagram showing a laser cutting apparatus for forming a pattern in a master plate for use in manufacturing the CD-R, said pattern corresponding to the wobbling groove of the CD-R.

The laser cutting apparatus 10 shown in FIG. 4 is designed to apply a laser beam to the photoresist 12 provided on the glass substrate 11 in order to form a latent image of the wobbling groove 5 of the CD-R on the photoresist 12. To form the latent image on the photoresist 12, the glass substrate 11 coated with the photoresist 12 is mounted on a substrate-rotating device 14 on the movable optical table 13. The device 14 rotates the glass substrate 11 in the direction of arrow B shown in FIG. 4. As the device 14 rotates the glass substrate 11, a movable optical table 13 moves in the direction of arrow C shown in FIG. 4. A latent image of the spiral wobbling groove 5 is thereby formed on the entire surface of the photoresist 12.

As shown in FIG. 4, the laser cutting apparatus 10 comprises a light source 15, an electro-optical modulator (EOM) 16, a light-detecting element 17, a beam splitter 18, a photodetector (PD) 19, and an automatic power controller (APC) 20. The light source 15 emits a laser beam. The electro-optical modulator 16 adjusts the intensity of the laser beam emitted from the light source 15. The light-detecting element 17 is arranged on the optical axis of the laser beam emerging from the electro-optical modulator 16. The beam splitter 18 splits the laser beam coming through the light-detecting element 17 into a reflected beam and a passing beam. The photodetector 19 detects the laser beam that has passed through the beam splitter 18. The automatic power controller 20 applies a signal electric field to the electro-optical modulator 16, thereby to adjust the intensity of the laser beam the modulator 16 outputs.

In the laser cutting apparatus 10, the light source 15 emits a laser beam to the electro-optical modulator 16. Driven by the signal electric field applied from the automatic power controller 20, the electro-optical modulator 16 adjusts the intensity of the laser beam. The laser beam is then applied to the light-detecting element 17. The light-detecting element 17 allows the passage of only a part of the laser beam, which becomes S-polarized light.

The light source 15 may be any type of a laser available. Preferably, it is one that emits a laser beam of a relatively short wavelength. To be specific, the light source 15 should better be a Kr laser that emits a beam having wavelength of 413 nm, a He—Cd laser that emits a beam having wavelength of 442 nm, or the like.

The beam splitter 18 receives splits the laser beam that has passed through the light-detecting element 17 and splits the same into a reflected beam and a passing beam, which is applied to the photodetector 19. The photodetector 19 detects the intensity of the passing beam and generates a signal that corresponds to the intensity of the passing beam. The signal is supplied to the automatic power controller 20. In accordance with the signal supplied from the photodetector 19, the controller 20 adjusts the signal electric field applied to the electro-optical modulator 16, so that the photodetector 19 detects may detect the intensity of the light at a predetermined constant level. That is, the automatic power controller 20 performs automatic power control (APC) to impart a constant intensity to the laser beam emitted from the electro-optical modulator 16. Thus, the modulator 16 can generates a laser beam that is stable, though containing a small noise.

As shown in FIG. 4, the laser cutting apparatus 10 further comprises a modulation optical system and a mirror 26. The modulation optical system 21 receives the reflected beam (hereinafter called "exposure beam") from the beam splitter 18. The system 21 is designed to modulate the intensity of the exposure beam, i.e., the laser beam reflected by the beam splitter 18.

In the modulation optical system 21, a condenser lens 22 focuses the exposure beam on an acousto-optical modulator (AOM) 23. The acousto-optical modulator 23 has an acousto-optical element that is made of oxide tellurium (TeO$_2$). The modulator 23 modulates the intensity of the exposure beam, rendering the same suitable for a desired exposure pattern. In other words, the modulator 23 performs acousto-optical modulation on the exposure beam, making the same correspond to the pattern of the wobbling groove 5 of the CD-R to be manufactured. The exposure beam, thus modulated, is applied to a collimator lens 24. The collimator lens 24 converts the exposure beam to parallel light, which is output from the modulation optical system 21.

The modulation optical system 21 comprises a driver 25 for driving the acousto-optical modulator 23. To expose the photoresist 12 to light, a drive signal S1 is input to the driver 25. The drive signal S1 corresponds to the desired exposure pattern and has a predetermined level corresponding to the pattern of the wobbling groove 5. In accordance with the signal S1 the driver 25 drives the acousto-optical modulator 23. Thus driven, the acousto-optical modulator 23 performs acousto-optical modulation on the exposure beam.

The mirror 26 reflects the exposure beam emitted from the modulation optical system 21. The exposure beam is thereby guided to the movable optical table 13 in horizontal direction, or in parallel to the table 13. A deflection optical system 27 optically deflects the exposure beam.

The deflection optical system 27 is designed to deflect the exposure beam so that the beam spot may wobble on the surface of the photoresist 12 formed on the glass substrate 11. As shown in FIG. 4, the system 27 comprises a wedge prism 28, an acousto-optical deflector (AOD) 29, a wedge prism 30, a driver 31, and a voltage-controlled oscillator (VCO) 32. The exposure beam passes through the wedge prism 28, reaching the acousto-optical deflector 29 that has an acousto-optical element that is made of oxide tellurium (TeO$_2$). The deflector 29 optically deflects the exposure beam so that the beam spot may form a latent image of wobbling groove 5 on the photoresist 12 provided on the glass substrate 11. The exposure beam, thus deflected, passes through the wedge prism 30 and emerges from the deflection optical system 27.

The wedge prisms 28 and 30 are provided to apply the exposure beam to the lattice surface of the acousto-optical element of the deflector 29 so as to satisfy the Bragg condition, and to maintain the height of the horizontal path of exposure beam in the system 27 even after the deflector 29 deflects the exposure beam. That is, the wedge prism 28, acousto-optical deflector 29 and wedge prism 30 are arranged to make the lattice surface to meet the Bragg condition and maintain the height of the horizontal path of exposure beam.

The driver 31 is connected to the acousto-optical deflector 29 for driving the deflector 29. The input of the driver 31 is connected to the voltage-controlled oscillator 32. The voltage-controlled oscillator 32 receives a control signal S2 that contains absolute time data and FM-modulates a high-frequency signal by using the control signal S2. The high-frequency signal thus modulated is supplied to the driver 31. To expose the photoresist 12 to light, a signal representing the pattern of the wobbling groove is supplied from the oscillator 32 to the driver 31. In accordance with this signal the driver 31 drives the acousto-optical deflector 29. Thus driven, the deflector 29 optically deflects the exposure beam.

The exposure beam deflected by the deflection optical system 27 is applied to a magnifying lens 33. The lens 33 makes the exposure beam diverge. The exposure beam therefore attains a prescribed diameter. A mirror 34 reflects the exposure beam, guiding the same to an objective lens 35. The objective lens 35 focuses the beam on the photoresist 12. A latent image of the wobbling groove is thereby formed on the photoresist 12 that is provided in the glass substrate 11.

The substrate-rotating device 14 rotates the glass substrate 11 in the direction of arrow B of FIG. 4, while the movable optical table 13 is moving in the direction of arrow C of FIG. 4. Therefore, the beam spot wobbles on the photoresist 12, forming a latent image of the spiral wobbling groove 5 on the photoresist 12.

More specifically, in order to manufacture a master plate for a CD-R that has a recording density that is twice as high as that of the conventional CD-R, the glass substrate 11 is rotated such that the beam spot moves on the photoresist 12 at a linear speed of 0.88 m/sec. Further, every time the glass substrate 11 rotates through 360°, the movable optical table 13 is moved in the direction of arrow C for a distance of 1.10 μm (the track pitch). The beam spot therefore wobbles on the photoresist 12, forming a latent image of the wobbling groove 5 on the photoresist 12.

It is desired that the objective lens 35 for focusing the exposure beam on the photoresist 12 have a large numerical aperture NA to form a fine latent image of the wobbling groove 5. More precisely, the objective lens 35 should have a numerical aperture NA of about 0.9.

If necessary, the magnifying lens 33 changes the diameter of the exposure beam before the beam is applied to the photoresist 12, thereby adjusting the effective numerical aperture NA of the objective lens 35. In this case, it is possible to change the diameter of the beam spot on the photoresist 12 to an appropriate value.

In the laser cutting apparatus 10 described above, the magnifying lens 33 changes the diameter of the exposure beam. This makes it possible to adjust the width of the latent image to be formed on the photoresist 12, i.e., the width Wg of the wobbling groove of the CD-R that will be manufactured.

Therefore, the width Wg of the wobbling groove can be increased if the magnifying lens 33 increases the diameter of the exposure beam and the exposure beam is then applied to the photoresist 12 to form a latent image of the wobbling groove 5 on the photoresist 12 in the laser cutting apparatus 10. Conversely, the width Wg of the wobbling groove 5 can be decreased if the magnifying lens 33 decreases the diameter of the exposure beam and the exposure beam is then applied to the photoresist 12.

The diameter of the exposure beam may be adjusted by changing the focal distance of the collimator lens 24 incorporated in the modulation optical system 21. If the focal distance of the lens 24 is changed, thereby increasing the diameter of the exposure beam, and the exposure beam is applied to the photoresist 12, the width Wg of the wobbling groove 5 of the CD-R will increase. On the other hand, it the focal distance of the lens 24 is changed, thereby decreasing the diameter of the exposure beam, and the exposure beam is applied to the photoresist 12, the width Wg of the wobbling groove 5 of the CD-R will decrease.

The width Wg of the wobbling groove 5 of the CD-R can be adjusted by changing the intensity of the exposure beam in the laser cutting apparatus 10. If the intensity of the exposure beam is increased, the width Wg of the wobbling groove will increase. Conversely, if the intensity of the exposure beam is decreased, the width Wg of the wobbling groove will decrease.

The depth Dg of the wobbling groove 5 of the CD-R can be adjusted by changing the thickness of the photoresist 12 formed on the glass substrate 11. More precisely, the depth Dg of the wobbling groove 5 of the CD-R will increase if the depth of the groove pattern, i.e., the thickness of the photoresist 12, is increased. This is because the groove pattern formed by exposing the photoresist 12 to light corresponds to the wobbling groove 5 of the CD-R. Conversely, the depth Dg of the wobbling groove 5 of the CD-R will decrease if the thickness of the photoresist 12 is decreased.

The amplitude Ag of the wobbling groove made in the CD-R can be adjusted by changing the angle at which the acousto-optical deflector 29 provided in the deflection optical system 27 deflects the exposure beam. That is, the amplitude Ag of the groove will be increased if the angle of deflecting the exposure beam is increased, and will be decreased if the angle of deflecting the exposure beam is decreased.

CD-Rs having a recording density two times or four times as high as the recording density of the existing standard CD-R were manufactured by the method described above. These CD-Rs were different in terms of depth, width and amplitude of the wobbling groove 5. These CD-Rs were tested to demonstrate the advantage of the present invention.

To be more specific, the CD-Rs were manufactured by using a master plate prepared by using the laser cutting apparatus 10. That is, each CD-R was made in the following manner. First, a disc substrate 1 made of polycarbonate (diffractive index n=1.58) was made by using the master plate. Then, the disc substrate was coated with a recording-layer material consisting mainly of cyanine dye, thereby forming a recording layer on the disc substrate 1. Next, a thin silver film was formed on the recording layer by sputtering, thus forming a reflection film 3 having a thickness of about 100 nm. An ultraviolet-curing resin layer was formed on the reflection film 3, and ultraviolet rays were applied to the resin layer, forming a protective layer 4 having a thickness of about 10 $\mu$m.

In the course of forming a latent image of the wobbling groove 5 on the photoresist 12 by using the laser cutting apparatus 10, the substrate-rotating device 14 rotated the glass substrate 11 such that the beam spot moved on the photoresist 12 at a linear speed of 0.88 m/sec. Further, every time the glass substrate 11 rotated through 360°, the movable optical table 13 was moved in parallel to the glass substrate 11 for a distance of 1.10 $\mu$m. This feed pitch of the movable optical table 13 corresponds to the track pitch Tp of the CD-R. Thus, the CD-R had a track pitch of 1.10 $\mu$m.

The deflection optical system 27 deflected the exposure beam in the process of forming a latent image of the wobbling groove 5 on the photoresist 12 in the laser cutting apparatus 10. More specifically, a high-frequency signal having center frequency of 224 MHz was FM-modulated with the control signal S2 having frequency of 22.05 kHz (ATIP wobble signal), and the signal thus modulated was supplied to the driver 31 from the voltage-controlled oscillator 51. In accordance with this signal the driver 31 drove the acousto-optical deflector 29. Thus driven, the deflector 29 optically deflected the exposure beam, whereby the ATIP wobble signal was recorded in the form of the wobbling of the groove 5.

In the process of forming a latent image of the wobbling groove 5 on the photoresist 12 by the use of the laser cutting apparatus 10, the thickness of the photoresist 12 was changed, thereby providing double-density CD-Rs that differed in the depth Dg of the wobbling groove 5. To state more precisely, five double-density CD-Rs were made that had groove depths of 155 nm, 170 nm, 185 nm, 200 nm and 230 nm, respectively.

Moreover, the diameter of the exposure beam was changed in the process of forming a latent image of the wobbling groove 5 on the photoresist 12 by the use of the laser cutting apparatus 10, thus providing double-density CD-Rs that differed in the width Wg of the wobbling groove 5. More correctly, four double-density CD-Rs were manufactured that had groove widths of 0.21 $\mu$m, 0.275 $\mu$m, 0.38 $\mu$m and 0.50 $\mu$m, respectively.

Furthermore, the amplitude Ag of the wobbling groove 5 was changed by the acousto-optical deflector 29 in the process of forming a latent image of the wobbling groove 5 on the photoresist 12 by the use of the laser cutting apparatus 10. That is, the amplitude Ag was varied to ±16 nm, ±20 nm, ±24 nm, ±28 nm, ±32 nm and ±35 nm, thereby manufacturing six double-density CD-Rs that differed in terms of the amplitude Ag of the wobbling groove 5.

Figure 5:
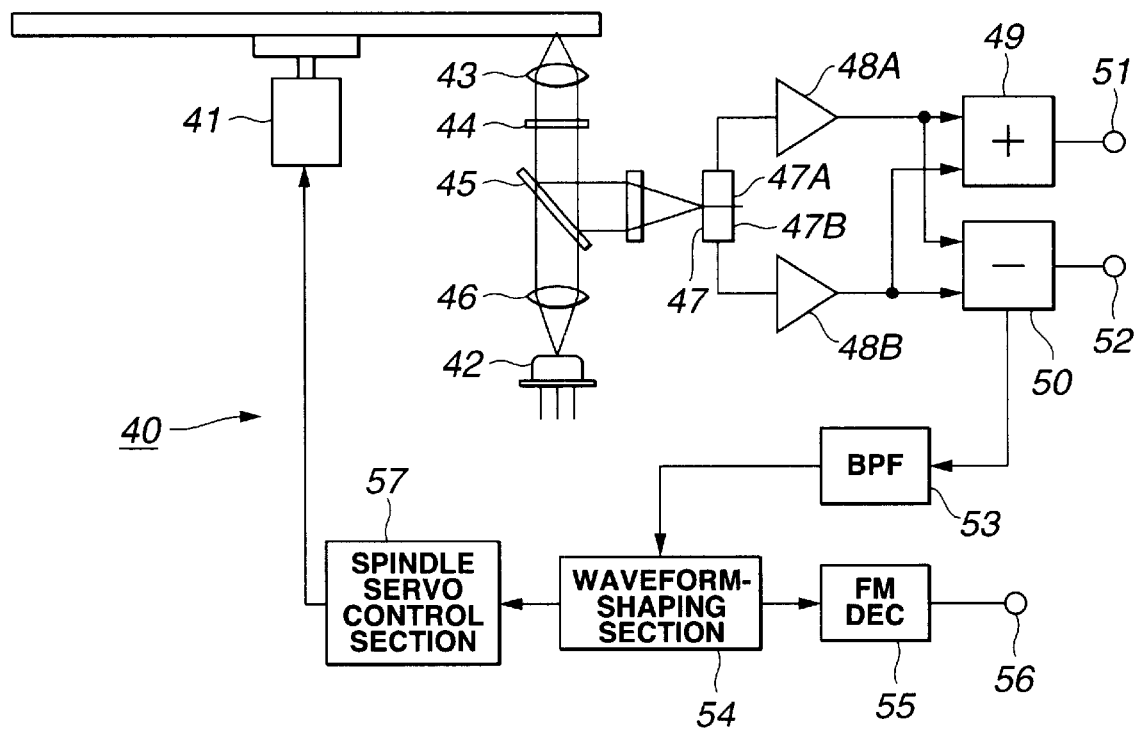
FIG. 5 is a diagram illustrating an apparatus for recording signals on, and reproducing signals from, the CD-R shown in FIG. 1.

The various double-density CD-Rs, manufactured as described above, were set in a recording/reproducing apparatus 40 of the type shown in FIG. 5. In the apparatus 40, each CD-R was rotated at a linear speed of 0.88 m/sec. A beam is applied to the wobbling groove 5 of the CD-R, thus tracking the wobbling groove 5. An FM-modulated wobble signal having a frequency of 22.05 kHz was thereby demodulated, obtaining the absolute time data. EFM signals were thus recorded in the desired parts of the dye-based recording film provided in the wobbling groove 5. Thereafter, the EFM signals were reproduced from the various double-density CD-Rs by means of the recording/reproducing apparatus 40.

The recording/reproducing apparatus 40 shown in FIG. 5 comprises a spindle motor 41 for rotating double-density CD-Rs at a linear speed of 0.88 m/sec. The recording/reproducing apparatus 40 comprises an optical system, too. The optical system comprises a semiconductor laser 42, an objective lens 43, a quarter-wave plate 44, a beam splitter 45, a collimator lens 46, and a two-segment photosensor 47. The semiconductor laser 42 emits a laser beam having a wavelength $\lambda$ of about 780 nm. The objective lens 43 has a numerical aperture of 0.55.

The two-segment photosensor 47 comprises two light-receiving elements 47A and 47B which are arranged side by side in the radial direction of the double-density CD-R that is rotated by the spindle motor 41. The output signal of the light-receiving element 47A is supplied via an amplifier 48A to an adder circuit 49 and a subtracter circuit 50. The output signal of the light-receiving element 47B is supplied via an amplifier 48B to the adder circuit 49 and subtracter circuit 50.

In the recording/reproducing apparatus 40, the adder circuit 49 generates an HF signal (EFM signal) that has a magnitude (Sa+Sb), where Sa is the output signal of the amplifier 48A and Sb is the output signal of the amplifier 48B. The HF signal is output from an output terminal 51. In the meantime, the subtracter circuit 50 generates a push-pull signal that has a magnitude (Sa−Sb), which is output from an output terminal 52.

The recording/reproducing apparatus 40 demodulates an FM-modulated wobble signal (frequency: 22.05 kHz) in the following way. First, the push-pull signal output from the output terminal 52 is supplied to a tracking servo circuit (not shown). The push-pull signal has a tracking error component. The tracking servo circuit performs, for example, synchronous detection on the push-pull signal, thereby generating a tracking error signal.

The push-pull signal output from the output terminal 52 is supplied to a band-pass filter 53, too. The output signal of the band-pass filter is supplied to a waveform-shaping circuit 54.

The output signal of the waveform-shaping circuit 54 is supplied to an FM decoder 55. The FM decoder 55 generates absolute time data from the output signal of the circuit 54. The absolute time data is output from an output terminal 56.

The waveform-shaping circuit 54 generates a clock signal, which is supplied to a spindle servo control circuit 57. The control circuit 57 controls the spindle motor 41 in accordance with the clock signal. Thus controlled, the spindle motor 41 rotates the double-density CD-R coupled to it in a stable manner at the linear speed of 0.88 m/sec.

The five types of double-density CD-Rs that had groove depths Dg of 155 nm, 170 nm, 185 nm, 200 nm and 230 nm, respectively, were tested for their evaluation in the recording/reproducing apparatus 40. More specifically, an FM-modulated signal was recorded on a selected recording track of each CD-R, while demodulating the ATIP wobble signal to acquire the absolute time data. The FM-modulated signal was then reproduced from each double-density CD-R. Jitter was generated when the signal was reproduced from each CD-R tested. From the jitter the recording-reproducing characteristic (i.e., jitter characteristic) of the double-density CD-R was evaluated. Note that the five types of double-density CD-Rs thus tested had the same wobbling-groove width Wg of 0.4 µm and the same wobbling-groove amplitude Ag of ±28 nm.

The results of the test were as shown in the following Table 1. As Table 1 shows, the ATIP wobble signal was not able to be appropriately demodulated in the case of double-density CD-R having a wobbling-groove depth Dg of 155 nm. Nonetheless, the ATIP wobble signal was reliably demodulated by the method applied to the standard, single-density CD-R and the absolute time data was appropriately obtained, in the case of any other double-density CD-R tested.

TABLE 1

| wobbling-groove depth (Dg) | demodulation of wobble signal | jitter at reproduction |
|---|---|---|
| 155 nm | x | — |
| 170 nm | ○ | 29.0 ns |
| 185 nm | ○ | 29.5 ns |
| 200 nm | ○ | 29.8 ns |
| 230 nm | ○ | 31.5 ns |

As seen from the test results shown in Table 1, the ATIP wobble signal can be reliably demodulated from double-density CD-Rs of higher recording density than that of the standard CD-R, provided that the wobbling groove has a depth Dg of 170 nm.

The HF signal (EFM signal) output from the output terminal 51 was demodulated in the same way as the EFM signal reproduced from the single-density CD-R. The jitter in the signal thus demodulated was as shown in Table 1. That is, the jitter was 29.0 ns for the double-density CD-R having a wobbling-groove depth Dg of 170 nm. The jitter was 29.5 ns for the double-density CD-R having a wobbling-groove depth Dg of 185 nm. The jitter was 29.8 ns for the double-density CD-R having a wobbling-groove depth Dg of 200 nm. And the jitter was 31.5 ns for the double-density CD-R having a wobbling-groove depth Dg of 230 nm.

According to the Orange Book it is required that EFM signals be reproduced with jitter limited to 35 ns or less. The double-density CD-Rs, whose wobbling-groove depth Dg of which are 170 nm, 185 nm, 200 nm and 230 nm, meet this requirement. The jitter characteristic tends to deteriorate as the depth Dg of the wobbling groove 5 increases. It is predicted that a double-density CD-R can no longer meet that requirement if the depth Dg of the wobbling groove 5 exceeds 230 nm. From the test results shown in Table 1 it is understood that double-density CD-Rs can have a practically sufficient jitter characteristic if the wobbling groove 5 has a depth Dg of 230 nm or less.

Hence, it is desired that a double-density CD-R have a wobbling-groove depth Dg falling within the range of 170 nm to 230 nm to attain a practically adequate jitter characteristic, while making it possible to demodulate an ATIP wobble signal and to reproduce time data from the ATIP wobble signal. Generally, a desired value for the depth Dg of a wobbling groove ranges from $\lambda/2.90$ n to $\lambda/2.15$ n. (It should be noted that $\lambda$ is the wavelength of the light beam applied to the CD-R to record and reproduce signals and n is the refractive index of the substrate of the CD-R.) The beam applied to the double-density CD-Rs tested has the wavelength of 780 nm, and the substrates of the CD-Rs tested have the refractive index of 1.58. Thus, the depth Dg of 170 nm is $\lambda/2.90$ n, and the depth Dg of 230 nm is $\lambda/2.15$ n. It follows that the depth Dg of the wobbling groove 5 should fall within the range of $\lambda/2.90$ n to $\lambda/2.15$ n.

The four types of double-density CD-Rs which that had groove widths Wg of 0.21 µm, 0.275 µm, 0.38 µm and 0.50 µm, respectively, were tested for their evaluation in the recording/reproducing apparatus 40. These double-density CD-Rs had the same wobbling-groove depth Dg of 230 nm and the same wobbling-groove amplitude of ±28 nm.

The results of this test were as shown in Table 2 presented below. As Table 2 indicates, the ATIP wobble signal was not be appropriately demodulated in the case of double-density CD-R having a wobbling-groove width Wg of 0.21 µm. Nonetheless, the ATIP wobble signal was reliably demodulated by the method applied to the standard, single-density CD-R and the absolute time data was appropriately obtained, in the case of any other double-density CD-R tested.

TABLE 2

| wobbling-groove width (Wg) | demodulation of wobble signal | jitter at reproduction |
|---|---|---|
| 0.210 µm | x | — |
| 0.275 µm | ○ | 30.5 ns |
| 0.38 µm | ○ | 31.6 ns |
| 0.50 µm | ○ | 34.6 ns |

The test results shown in Table 20 reveal that the ATIP wobble signal can be reliably demodulated from double-density CD-Rs of higher recording density than that of the standard CD-R, provided that the wobbling groove has a width Wg of 0.275 µm.

The HF signal (EFM signal) output from the output terminal 51 was demodulated in the same way as the EFM signal reproduced from the single-density CD-R. The jitter in the signal thus demodulated was as shown in Table 2, too. Namely, the jitter was 30.5 ns for the double-density CD-R having a wobbling-groove width of 0.275 µm. The jitter was 31.6 ns for the double-density CD-R having a wobbling-groove width Wg of 0.38 µm. The jitter was 34.6 ns for the double-density CD-R having a wobbling-groove width Wg of 0.50 µm.

From the test results shown in Table 2 it is understood that double-density CD-Rs can attain 0.50 µm if the wobbling groove has a width of 0.50 µm or less. The jitter characteristic tends to deteriorate as the width Wg of the wobbling groove 5 increases. It is therefore predicted that a double-density CD-R can no longer attain a practically sufficient jitter characteristic if the width Wg of the wobbling groove exceeds the value of 0.50 µm.

It is therefore desired that a double-density CD-R have a wobbling-groove width Wg falling within the range of 0.275 µm to 0.50 µm to attain a practically adequate jitter characteristic, while making it possible to demodulate an ATIP wobble signal and to reproduce absolute time data from the ATIP wobble signal. The double-density CD-Rs tested had a track pitch Tp of 1.10 µm Hence, the ratio of the Width Wg of the wobbling groove to the track pitch Tp (Wg/Tp) is 25.0% for the CD-R that had a wobbling-groove width Wg of 0.275 µm. The ratio Wg/Tp is 45.5% for the CD-R that had a wobbling-groove width Wg of 0.50 µm. In view of this, it is desired that the ratio of the wobbling-groove width Wg to the track pitch Tp fall within the range of 25.0% to 45.5%.

As seen from Tables 1 and 2, an optical recording medium such as a CD-R which has a wobbling groove 5 extending along the recording track and on which signals are recorded in the form of changes in reflectance of organic dye-based recording material, while reproducing the wobbling signal from the wobbling groove 5 should satisfy two conditions. First, the wobbling groove 5 should have a depth Dg falling within the range of $\lambda/2.90$ n to $\lambda/2.15$ n. Second, the ratio of the wobbling-groove width Wg to the track pitch Tp (Wg/Tp) should fall within the range of 25.0% to 45.5%. Any optical recording medium that satisfies both conditions can reproduce a wobble signal of a magnitude large enough to record and reproduce signals and can attain a practically adequate jitter characteristic, even if the track pitch Tp is decreased to enhance the recording density.

The jitter in any signal recorded on a double-density CD-R depends on not only the depth Dg and width Wg of the wobbling groove 5, but also on the amplitude Ag of the wobbling groove 5. Three groups of double-density CD-Rs were prepared, each group consisting of six CD-Rs that had different wobbling-groove amplitudes Ag, and were tested to determine how the wobbling-groove amplitude Ag influenced the jitter characteristic of each CD-R. The double-density CD-Rs of the first group had the same wobbling-groove depth Dg of 180 nm and the same wobbling-groove width Wg of 0.40 µm. The double-density CD-Rs of the second group had the same wobbling-groove depth Dg of 230 nm and the same wobbling-groove width Wg of 0.40 µm. The double-density CD-Rs of the third group had the same wobbling-groove depth Dg of 230 nm and the same wobbling-groove width Wg of 0.50 µm. The six CD-Rs of each group had wobbling-groove amplitudes of ±16 nm, ±20 nm, ±24 nm, ±28 nm, ±32 nm and ±35 nm, respectively. The double-density CD-Rs of the three groups were tested by the above-mentioned method in the recording/reproducing apparatus 40.

The results of the test performed on the double-density CD-Rs of the first group, each having a wobbling groove 5 that was 180 nm deep and 0.40 µm broad, were as shown in Table 3 presented below.

TABLE 3

| Dg = 180 nm, Wg = 0.40 µm | | |
|---|---|---|
| wobbling-groove amplitudes (Ag) | demodulation of wobble signal | jitter at reproduction |
| ±16 nm | x | — |
| ±20 nm | ○ | 29.0 ns |
| ±24 nm | ○ | 29.8 ns |
| ±28 nm | ○ | 29.4 ns |
| ±32 nm | ○ | 29.5 ns |
| ±35 nm | ○ | 30.5 ns |

As seen from Table 3, no ATIP wobble signals could not be demodulated in the case of the double-density CD-R having a wobbling-groove amplitude Ag of ±16 nm. Nonetheless, an ATIP wobble signal was demodulated in any other CD-R of the first group, more reliably than in the single-density CD-R, and the absolute time data was appropriately generated from the ATIP wobble signal.

The HF signal (EFM signal) output from the output terminal 51 was demodulated in the same way as the EFM signal reproduced from the single-density CD-R. The jitter in the signal thus demodulated was as shown in Table 3, too. As Table 3 shows, the jitter was 29.0 ns for the double-density CD-R having a wobbling-groove amplitude Ag of ±20 mn. The jitter was 29.8 ns for the double-density CD-R having a wobbling-groove amplitude Ag of ±24 mn. The jitter was 29.4 ns for the double-density CD-R having a wobbling-groove amplitude Ag of ±28 mn. The jitter was 29.5 ns for the double-density CD-R having a wobbling-groove amplitude Ag of ±32 mn. The jitter was 30.5 ns for the double-density CD-R having a wobbling-groove amplitude Ag of ±35 mn.

The results of the test performed on the double-density CD-Rs of the second group, each having a wobbling groove 5 that was 230 nm deep and 0.40 µm broad, were as shown in Table 4 presented below. It should be noted that the CD-Rs had the upper-limit wobbling-groove depth Dg of 230 nm. If they had a deeper wobbling groove, they could not have attained a practically sufficient jitter characteristic.

TABLE 4

Dg = 230 nm, Wg = 0.40 μm

| wobbling-groove amplitudes (Ag) | demodulation of wobble signal | jitter at reproduction |
|---|---|---|
| ±16 nm | x | — |
| ±20 nm | o | 30.8 ns |
| ±24 nm | o | 31.4 ns |
| ±28 nm | o | 31.7 ns |
| ±32 nm | o | 31.8 ns |
| ±35 nm | o | 32.5 ns |

As can be understood from Table 4, no ATIP wobble signals could not be demodulated in the case of the double-density CD-R having a wobbling-groove amplitude Ag of ±16 mn. Nonetheless, an ATIP wobble signal was demodulated in any other CD-R of the second group, more reliably than in the single-density CD-R, and the absolute time data was appropriately generated from the ATIP wobble signal.

The HF signal (EFM signal) output from the output terminal 51 was demodulated in the same way as the EFM signal reproduced from the single-density CD-R. The jitter in the signal thus demodulated was as shown in Table 4, too. As shown in Table 4, the jitter was 30.8 ns for the double-density CD-R having a wobbling-groove amplitude Ag of ±20 mn. The jitter was 31.4 ns for the double-density CD-R having a wobbling-groove amplitude Ag of ±24 mn. The jitter was 31.7 ns for the double-density CD-R having a wobbling-groove amplitude Ag of ±28 mn. The jitter was 31.8 ns for the double-density CD-R having a wobbling-groove amplitude Ag of ±32 mn. The jitter was 32.5 ns for the double-density CD-R having a wobbling-groove amplitude Ag of ±35 mn.

The results of the test performed on the double-density CD-Rs of the third group, each having a wobbling groove 5 that was 230 nm deep and 0.50 μm broad, were as shown in Table 5 presented below. It should be noted that these CD-Rs had the upper-limit wobbling-groove depth and the upper-limit wobbling-groove width Wg. If they had a deeper and broader wobbling groove, they could not have attained a practically sufficient jitter characteristic.

TABLE 5

Dg = 230 nm, Wg = 0.50 μm

| wobbling-groove amplitudes (Ag) | demodulation of wobble signal | jitter at reproduction |
|---|---|---|
| ±16 nm | x | — |
| ±20 nm | o | 32.5 ns |
| ±24 nm | o | 33.2 ns |
| ±28 nm | o | 33.8 ns |
| ±32 nm | o | 34.0 ns |
| ±35 nm | o | 34.9 ns |

As seen from Table 5, no ATIP wobble signals could not be demodulated in the case of the double-density CD-R having a wobbling-groove amplitude Ag of ±16 mn. Nevertheless, an ATIP wobble signal was demodulated in any other CD-R of the third group, more reliably than in the single-density CD-R, and the absolute time data was appropriately generated from the ATIP wobble signal.

The HF signal (EFM signal) output from the output terminal 51 was demodulated in the same way as the EFM signal reproduced from the single-density CD-R. The jitter in the signal thus demodulated was as shown in Table 5, too.

As Table 5 shows, the jitter was 32.5 ns for the double-density CD-R having a wobbling-groove amplitude Ag of ±20 mn. The jitter was 33.2 ns for the double-density CD-R having a wobbling-groove amplitude Ag of ±24 mn. The jitter was 33.8 ns for the double-density CD-R having a wobbling-groove amplitude Ag of ±28 mn. The jitter was 34.0 ns for the double-density CD-R having a wobbling-groove amplitude Ag of ±32 mn. The jitter was 34.9 ns for the double-density CD-R having a wobbling-groove amplitude Ag of ±35 mn.

As seen from Tables 3 to 5, the ATIP wobble signal reproduced from a double-density CD-R, which has a recording density higher than the standard, single-density CD-R, can be appropriately demodulated, provided that the CD-R has a wobbling groove having an amplitude of ±20 mn or more.

From Tables 3 to 5 it is also clear that a double-density CD-R can have a practically adequate jitter characteristic if the wobbling groove 5 has an amplitude Ag of ±35 nm or less. The jitter characteristic tends to deteriorate as the width Wg of the wobbling groove increases. Hence, it is predicted that the double-density CD-R can no longer attain a practically adequate jitter characteristic if the amplitude Ag of the wobbling groove exceeds the value of ±35 nm.

In view of the foregoing, it is desired that the wobbling groove 5 of a double-density CD-R should have an amplitude Ag falling within the range of ±20 nm to ±35 nm, so that the CD-R may attain good jitter characteristic, while making it possible to demodulate an ATIP wobble signal and to reproduce absolute time data from the ATIP wobble signal. It should be recalled that the double-density CD-Rs tested had a track pitch Tp of 1.10 μm. Therefore, the ratio of the amplitude Ag of the wobbling groove 5 to the track pitch Tp (Ag/Tp) is ±1.82% for the double-density CD-R that had a wobbling-groove amplitude Ag of ±20 nm. The ratio Ag/Tp is ±3.18% for the CD-R that had a wobbling-groove amplitude of ±35 nm. In view of this, it is desired that the ratio of the wobbling-groove amplitude Ag to the track pitch Tp fall within the range of ±1.82% to ±3.18%.

As seen from Tables 1 to 5, an optical recording medium such as a CD-R which has a wobbling groove 5 extending along the recording track and on which signals are recorded in the form of changes in reflectance of organic dye-based recording material, while reproducing the wobbling signal from the wobbling groove 5 should satisfy three conditions. First, the wobbling groove 5 should have a depth Dg falling within the range of $\lambda/2.90$ n to $\lambda/2.15$ n. Second, the ratio of the wobbling-groove width Wg to the track pitch Tp (Wg/Tp) should fall within the range of 25.0% to 45.5%. Third, the ratio of the wobbling-groove amplitude Ag to the track pitch Tp (Ag/Tp) should fall within the range of ±1.82% to ±3.18%. Any optical recording medium that satisfies both conditions can reproduce a wobble signal of a magnitude large enough to record and reproduce signals and can attain a practically adequate jitter characteristic, even if the track pitch Tp is decreased to enhance the recording density.

What is claimed is:

1. An optical recording medium which has recording tracks and a wobbling groove extending along the recording tracks and which is designed to record signals in the form of changes in reflectance of organic dye-based recording material, while reproducing a wobbling signal from the wobbling groove, wherein the wobbling groove has a depth ranging from $\lambda/2.90$ n to $\lambda/2.15$ n, where $\lambda$ is the wavelength of a light beam applied to record and reproduce signals and n is the refractive index of medium existing between a surface to which the light beam is applied and surface in which the wobbling groove is made, and Wg/Tp falls within the range of 25.0% to 45.5%, where Wg is the width of the wobbling groove and Tp is the pitch of the recording tracks.

2. The optical recording medium according to claim 1, wherein Ag/Tp falls within the range of ±1.82% to ±3.18%, where Ag is the amplitude of the wobbling groove.

3. The optical recording medium according to claim 1, wherein the signals to be recorded in the recording tracks are EFM-modulated signals, and the wobbling signal is either a signal containing either FM-modulated absolute time data or a signal containing address data.

4. A master plate for use in manufacturing an optical recording medium which has recording tracks and a wobbling groove extending along the recording tracks and which is designed to record signals in the form of changes in reflectance of organic dye-based recording material, while reproducing a wobbling signal from the wobbling groove, wherein said master plate having a groove pattern that corresponds to the wobbling groove of the optical recording medium;

said wobbling groove having a depth ranging from $\lambda/2.90$ n to $\lambda/2.15$ n, where $\lambda$ is the wavelength of a light beam applied to record and reproduce signals and n is the refractive index of medium existing between a surface to which the light beam is applied and surface in which the wobbling groove is made, and Wg/Tp falling within the range of 25.0% to 45.5%, where Wg is the width of the wobbling groove and Tp is the pitch of the recording tracks.

5. The master plate according to claim 4, wherein Ag/Tp falls within the range of ±1.82% to ±3.18%, where Ag is the amplitude of the wobbling groove.

* * * * *

UNITED STATES PATENT AND TRADEMARK OFFICE
CERTIFICATE OF CORRECTION

PATENT NO. : 6,597,655 B2
DATED : July 22, 2003
INVENTOR(S) : Manabu Sato et al.

It is certified that error appears in the above-identified patent and that said Letters Patent is hereby corrected as shown below:

Column 6,
Line 12, change "layer by" to -- layer 2 by --.

Column 8,
Lines 19 and 29, change "groove is" to -- groove 5 is --.
Line 64, change "groove of" to -- groove 5 of --.
Line 66, change "groove can" to -- groove 5 can --.

Column 9,
Line 14, change "it" to -- if --.
Lines 23, 25 and 40, change "groove will" to -- groove 5 will --.
Line 36, change "groove made" to -- groove 5 made --.
Line 56, change "substrate was" to -- substrate 1 was --.
Line 58, change "layer on" to -- layer 2 on --.
Line 59, change "layer by" to -- layer 2 by --.

Column 12,
Line 15, change "groove has" to -- groove 5 has --.

Column 13,
Lines 17 and 31, change "groove has" to -- groove 5 has --.
Lines 35-36, change "groove exceeds" to -- groove 5 exceeds --.
Line 43, change "1.10 $\mu$m Hence," to -- 1.10 $\mu$m. Hence, --.
Line 44, change "groove to," to -- groove 5 to --.

Column 14,
Lines 53, 54, 56, 58 and 60, change "mn" to -- nm --.

Column 15,
Lines 17, 27, 28, 30, 32, 34 and 59, change "mn" to -- nm --.

Column 16,
Lines 3, 4, 6, 8, 10 and 15, change "mn" to -- nm --.

UNITED STATES PATENT AND TRADEMARK OFFICE
CERTIFICATE OF CORRECTION

PATENT NO. : 6,597,655 B2
DATED : July 22, 2003
INVENTOR(S) : Manabu Sato et al.

It is certified that error appears in the above-identified patent and that said Letters Patent is hereby corrected as shown below:

Column 15 (cont'd),
Line 20, change "groove increases" to -- groove 5 increases --.

Signed and Sealed this

Twentieth Day of April, 2004

JON W. DUDAS
*Acting Director of the United States Patent and Trademark Office*